March 19, 1963  M. QUERCIA  3,081,917
RESERVOIR PROVIDED WITH A VALVE
Filed July 28, 1959  4 Sheets-Sheet 1
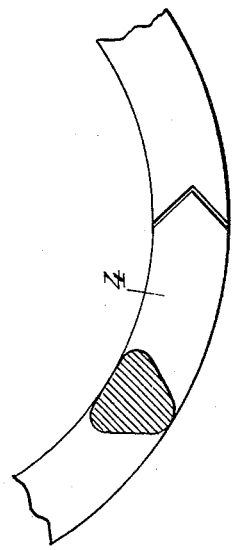
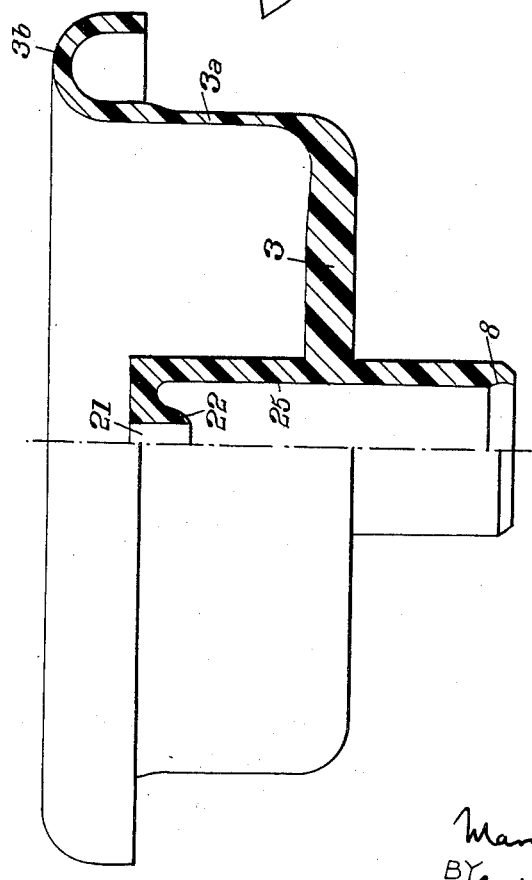
INVENTOR
Marcel Quercia
BY Michael S. Striker
ATTORNEY March 19, 1963
M. QUERCIA
3,081,917
RESERVOIR PROVIDED WITH A VALVE
Filed July 28, 1959
4 Sheets-Sheet 2
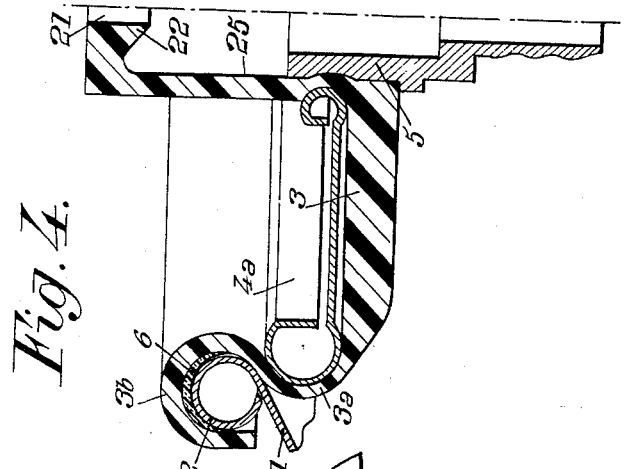
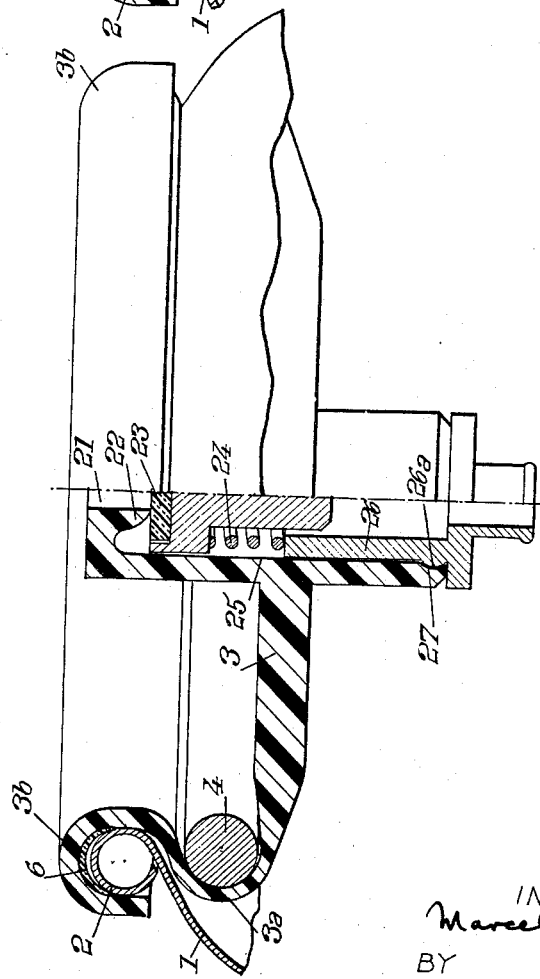
INVENTOR
Marcel Quercia
BY
Michael S. Striker
ATTORNEY March 19, 1963    M. QUERCIA    3,081,917
RESERVOIR PROVIDED WITH A VALVE
Filed July 28, 1959    4 Sheets-Sheet 3
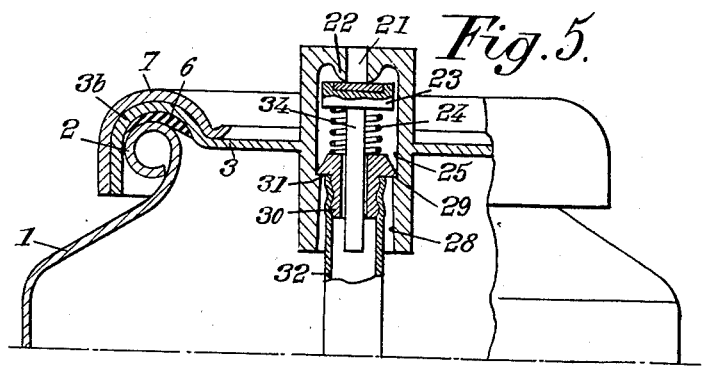
Fig.5.
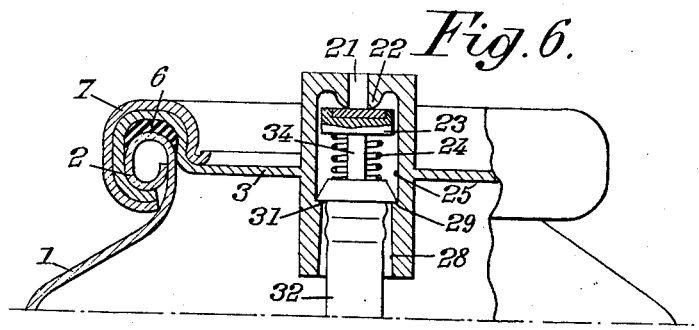
Fig.6.
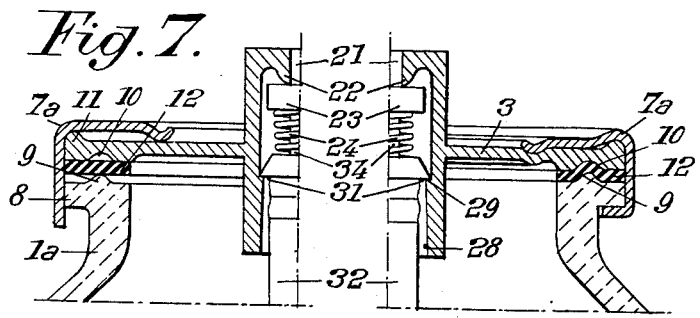
Fig.7.
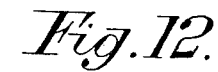
Fig.12.
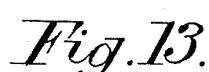
Fig.13.
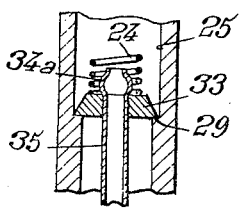
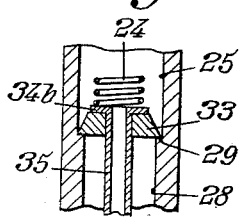
INVENTOR
Marcel Quercia
BY
Michael S. Striker
ATTORNEY March 19, 1963 M. QUERCIA 3,081,917
RESERVOIR PROVIDED WITH A VALVE
Filed July 28, 1959 4 Sheets-Sheet 4
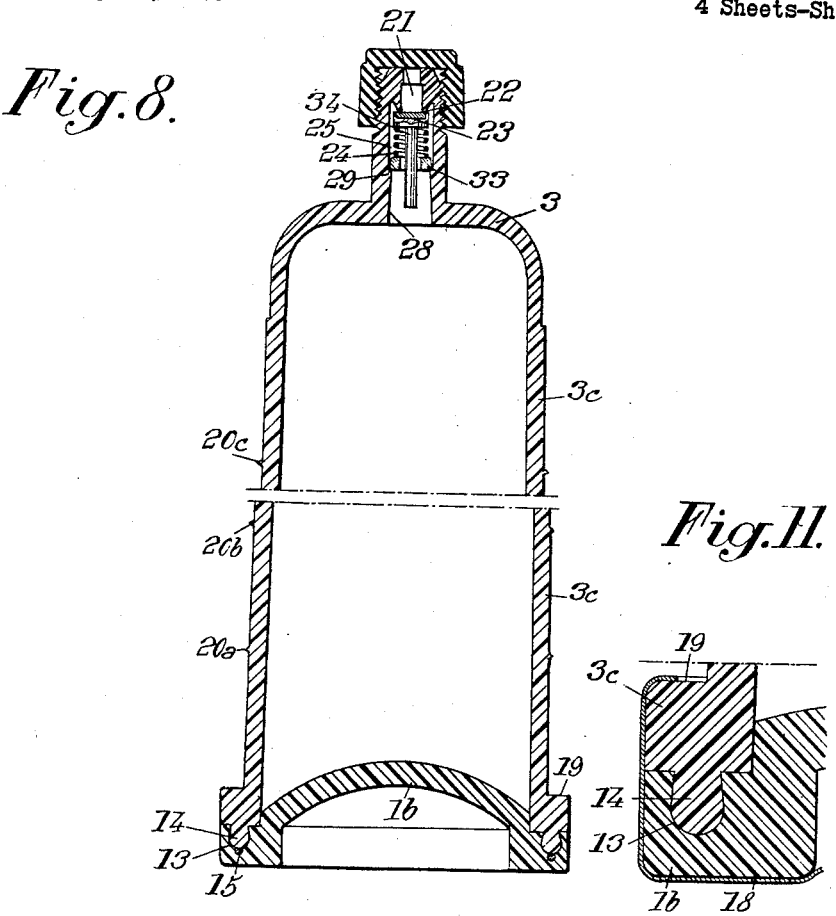
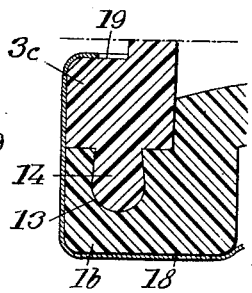
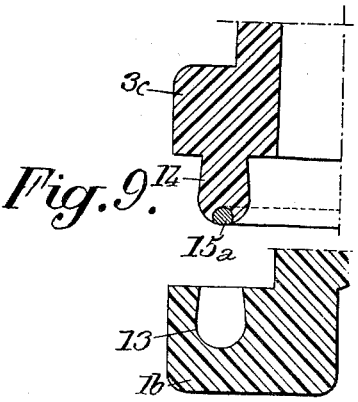
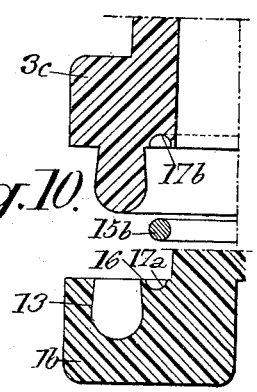
INVENTOR
Marcel Quercia
BY
Michael S. Striker
ATTORNEY 3,081,917
RESERVOIR PROVIDED WITH A VALVE
Marcel Quercia, Paris, France, assignor to Societe d'Etudes et de Recherches Techniques, Paris, France, a French society
Filed July 28, 1959, Ser. No. 830,034
Claims priority, application France July 29, 1958
3 Claims. (Cl. 222—394)

The present invention relates to a reservoir of fluid under pressure with an outlet orifice controlled by a valve.

The reservoir, which is the object of the invention, is characterised in that it comprises on the one hand a one-piece unit constituting the body of the valve, the seating of the clapper and a portion of the body of the reservoir, this member being preferably molded from plastic material, particularly from superpolyamide or polyethylene and, on the other hand, a portion serving to complete the body of the reservoir, the said one-piece units and complementary portion being joined together in a fluid-tight manner.

This complementary portion which can particularly constitute the largest portion of the total body can be constructed either of the same material as the one-piece unit, or of a different material such as sheet-metal, glass, etc.

In the description which follows below, there will be shown with reference to the accompanying drawings, a number of effective methods in accordance with the present invention, enabling the one-piece unit to be fixed to the remaining portion of the body of the reservoir according to the material with which the said remaining portion is constructed.

A number of assemblies of the valve in the one-piece unit, also in accordance with the invention, will be shown at the same time with reference to the same drawings.

These drawings show:

In FIG. 1, in half-elevation and axial half-cross-section, the one-piece unit intended to receive the valve and to be fixed in fluid-tight manner to a reservoir, the above-mentioned unit being shown before being placed in position on a complementary portion of the reservoir;

In FIG. 2, under the same conditions, the one-piece unit after being placed in position;

In FIG. 3, looking in plan, with parts broken away, a locking member of the above-mentioned one-piece unit, shown in sectional elevation in FIG. 2;

In FIG. 4, in axial half-cross-section, a one-piece unit similar to that of FIG. 1, but held in position by a different locking member than that shown in FIGS. 2 and 3.

In FIGS. 5 and 6, partly in axial cross-section, partly in elevation, respectively at the moment of placing said one-piece unit in position, and after this latter has been fixed on another one-piece unit containing the valve and its fixing means, on a complementary portion of the reservoir;

In FIG. 7, in axial half-cross-section, on the left at the moment of placing in position, and on the right after fixing the one-piece unit on a complementary portion of the glass body of the reservoir, another form of embodiment of a molded one-piece unit with its valve and its fixing means;

In FIG. 8, in axial cross-section, a further form of embodiment of a reservoir established in accordance with the invention;

In FIGS. 9, 10 and 11, in partial cross-sections, a number of alternative forms of fluid-tight fixation of a one-piece unit with a complementary portion, in this case the bottom of the reservoir;

Finally in FIGS. 12 and 13, in axial cross-section, two forms of embodiment in accordance with the invention, of assembly of valves of the molded one-piece unit which contains them.

In accordance with the invention, a one-piece unit is constructed comprising a housing for a valve, a seating for the clapper of said valve and a portion of the body of the reservoir to which is fixed in a fluid-tight manner a portion serving to complete the body so as to form the entire reservoir.

The one-piece unit is preferably formed by moulding from a plastic material, particularly from polyhexamethylene-adipamide, the shape and the fixing means of the one-piece unit depending on the shape and on the material of which the portion which serves to complete the body of the reservoir is formed.

It will first be assumed that the said complementary portion 1 in fact constitutes the largest portion of the body of the reservoir and comprises at the edge of an upper orifice intended to be closed by the added one-piece unit and having a slightly smaller section than that of the reservoir, a reinforcement constituted for example by a circular bead 2.

In this case the one-piece unit 3 is provided with a lateral wall 3a preferably thinner than the bottom of said one-piece unit and terminating towards the top in a bead 3b, turned towards the exterior and opened towards the bottom (inverted U-section), adapted to cover the bead 2 of the reservoir.

A circular locking member such as for example and firstly a toric hoop 4 of circular steel section (FIG. 2) or of triangular shape (FIG. 3), or the like, is caused to co-act with the lateral wall 3a of this part 3, said locking member being capable of being subjected to a continuous radial expansion after having been engaged in the above mentioned part, this expansion being followed by a deformation of the above mentioned lateral wall 3a which is thus forced under the bead 2 of the reservoir and gripped between the locking member 4 and the body 1 of the reservoir.

The part 3 has been shown in FIG. 1 before deformation of its lateral wall, that is to say in its form prior to assembly and, in FIG. 2, after deformation of the above-mentioned lateral wall, that is to say in the final position occupied by the lateral wall after the hoop 4 has been placed in position.

Although a permanent deformation of the locking member 4 can be contemplated so that it is thus placed in its final position, it appears to be preferable to arrange said member in such manner that it takes up this position elastically, in which case it is subjected to constriction so as to engage it in the part 3.

In the case which is contemplated by way of example, in which the locking member 4 is constituted by a flexible hoop, the extremities are preferably arranged oppositely facing said hoop in such manner that when the hoop is in its final position, the said extremities are in contact and co-operate by fitting on to each other so as to prevent any subsequent accidental constriction of the above mentioned hoop. In this manner it is certain that the part 3 is finally locked on the body 1 of the reservoir.

For this purpose it is possible for example, as shown in FIG. 3 to provide a double bevel of V-shape at one of the extremities of the hoop 4 and to arrange an additional notch in the other extremity of the said hoop.

In FIG. 4 a further form of embodiment of the locking member of the part 3 is shown, in acordance with which the said locking member is constituted by a washer having the shape of 4a provided with an internal bead and an external bead having a certain radial elasticity, the external bead co-operating with the lateral wall 3a of the part 3, whilst the internal bead can serve to grip and retain a central unit, for example a siphon carrier 5.

In any case it will be an advantage to reinforce the fluid-tightness of the reservoir by inserting between the bead 2 of the said reservoir and the bead 3b of the part 3, a sealing ring 6, for example of rubber.

In FIGS. 5 and 6 is shown a further method of embodiment of the clamping-member of the part 3, in accordance with which the said locking member is constituted by an insetting washer 7 adapted to cover the bead 3b over the bead 2 (FIG. 5) and to be inset around this latter by tightly gripping together the beads 3b and 2 and the joint 6 located between the said beads (FIG. 6).

In FIG. 7 is shown a further form of embodiment of a reservoir in accordance with the invention and particularly suitable in the case in which the main portion 1a of the body of the reservoir or flask is intended to be formed of glass.

In this case, a flask 1a is provided round its upper orifice with a rim 8 directed towards the exterior and which is provided with a flat annular surface on each side of a rib 9, around the plane of the opening of the orifice. At the edge of a substantially flat portion of the part 3, an additional groove 10 is provided on the lower face in co-operation with the rib 9 and, at the periphery of the upper face, a rib 11. The clamping member is constituted by an insetting washed 7a, the cross-section of which has substantially the shape of an L, the member 3 being covered at its periphery (on the left side of FIG. 7) with said clamping member, this latter being inset on the rim 8 (on the right side of FIG. 7). A washer-joint 12 of rubber or like material can be provided between the one-piece unit 3 and the flask 1a.

In accordance with a further form of embodiment shown in FIG. 8, the largest portion of the reservoir is constituted by the one-piece unit 3 by extending this latter towards the bottom at 3c and by fixing the said one-piece unit by its lower edge in a fluid-tight manner to the portion which serves to complete the body of the reservoir which, in this instance, can be constituted by a single bottom 1b.

In order to obtain this fluid-tight mounting, on the edges of these parts 3c and 1b respectively, there are molded in reverse draw-taper male and female assembly portions having corresponding profiles and these parts are forcibly fitted into each other so as to obtain in this manner a fluid-tight assembly which sets up a certain resistance to the separation of these two parts.

The assembly portions which are molded in reverse draw-taper are preferably constituted in one case by a groove 13 which is wider in the vicinity of its bottom than at its opening and which is for example provided at the edge of the bottom 1b and, in the other case, by a rib 14 which, is correspondingly wider at its peak than at its base and is in this instance provided at the lower edge of the body 3c.

The rib 14 is forcibly introduced, taking advantage of the elasticity proper of the plastic material, into the groove 13 and remains tightly gripped in this latter, thus ensuring a sufficiently strong and tight assembly of the constituent parts of the reservoir in a number of cases.

However, in other cases, particularly when the two parts 3c and 1b are both formed of the same plastic material, especially of polyhexamethylene-adipamide and when the contents of the reservoir have to remain fluid-tight under a substantial pressure, which is the case for example, when the content is a liquefied gas, it can be an advantage to reinforce the assembly of the parts 3c and 1b.

For this purpose and in accordance with a particularly valuable solution, a ring of a good electrically conducting material is placed on the profiled assembly portion of at least one of the parts 1b or 3c. The parts are then assembled by means of forcibly fitting their assembly portions into each other in such manner that they come into mutual contact by closing completely on the ring. The two parts are then welded to each other around the ring by heating the ring in an alternating electro-magnetic field.

The ring in question can be constituted by a metallic wire 15.

In accordance with a first form of embodiment, this wire 15 is flush-mounted in the bottom of the groove 13.

In accordance with a further form of embodiment, shown in FIG. 9, the ring 15a is flush-mounted in the ridge of the rib 14.

In accordance with another form of embodiment shown in FIG. 10, the ring 15b is arranged on a step 16 formed in the surface of the edges at a position in which the edges cover each other at the moment of fitting together.

The housing of the metallic ring can be formed entirely in one of the parts 1b and 3c or alternatively half in one and half in the other of these parts simultaneously as shown, for example, at 17a and 17b of FIG. 10.

The assembly of the parts 1b and 3c can additionally be consolidated by means of an insetting member 18 of sheet-metal which rests on the one hand, on the bottom 1b and on the other hand on the shoulder 19 formed on the periphery of the body 3c and which extends at least approximately in a plane at right angles to the direction in which the groove 13 and the rib 14 engaged one with the other. Although the insetting by means of the element 18 serves a useful purpose in improving the solidity of the weld obtained by means of the ring 15, 15a, or 15b, it is to be noted that, in certain cases, the insetting obtained by means of the element 18 is sufficient without resorting to welding by means of the ring 15, 15a or 15b (this case is shown in FIG. 11).

The reservoir is preferably formed of a translucent material through which the level of the liquefied gas can be seen. It is an advantage to provide the body 3c with marks 20a, 20b, 20c, etc., thus providing a means of gauging the quantity to be taken from the reservoir or also of verifying the quantity available in the reservoir.

In accordance with a further feature of the invention, there is molded in the bottom of the valve body around the outlet orifice 21 an annular lip 22 which forms a projection towards the interior of the valve housing so as to serve as a seating for the clapper 23.

In accordance with another feature of the invention, the clapper 23 and its restoring spring 24 which tends to force the clapper against the lip 22 is held in position in the valve body 25. This latter forms a single unit with the part 3 by means of an element which is forcibly fitted inside the valve body 25, expanding it during its passage, and engages at its greatest perimeter in a groove or behind a shoulder provided for this purpose in the wall of the said body.

In accordance with a first form of embodiment (FIG. 2), the element in question is constituted by a socket 26 provided at its periphery with a rib 26a adapted to engage in a groove 27 formed in the body 25 next to its extremity oppositely facing the extremity which is provided with the lip 22.

In accordance with a further form of embodiment, there is provided on the upstream side of the cylindrical valve body 25 and co-axially with this latter, a conical passage 28 through which it is introduced and which, on account of its smaller diameter, smaller than that of the valve body, opens into the cylindrical body 25, thus forming a shoulder 29 at the base of said cylindrical body. The clapper 23 and its restoring spring 24 are then held in the cylindrical body 25 by means of an element having a slightly larger diameter than that of the introduction passage 28 at the level of the shoulder 29, this element being forcibly driven through the passage 28 by displacing the walls of this latter elastically up to the cylindrical body 25, in which said element comes to rest against the shoulder 29.

The element in question is usefully constituted by a socket 30 provided at its upper portion with a rim 31 by means of which it is supported on the shoulder 29 (FIGS. 5 to 7) and on which a plunger tube 32 (siphon) can be fitted.

The element in question can also be constituted by a simple washer 33 (FIG. 8).

Instead of providing the introduction passage 28 with a conical shape, or at the same time as giving it a conical shape, it is an advantage to provide the rim 31 of the socket 30 or the washer 33 with a conical flank, which facilitates the introduction in the cylindrical body 35 and improves the seating on the rim 29.

The clapper 23 is preferably guided in the body 25 by means of an axial rod 34 rigidly fixed to the clapper and sliding in the axial passage of the socket 30 or of the washer 33.

The washer 33 can be fitted with a plunger tube 35 by fitting this tube into the central passage of the washer (FIGS. 12 and 13). The tube can be held in place either by means of a widened portion 34a of the tube on either side or both sides of the washer (FIG. 12) or by means of a flange 34b at the end of the tube applied against the washer 33 by the spring 24.

What I claim is:

1. In a reservoir for a fluid under pressure, in combination, an elongated tubular valve housing made integral with said reservoir and communicating therewith from resiliently expandable plastic material and having an open outlet end portion of a given cross-sectional area, a central portion having a cross-sectional area greater than said given cross-sectional area, and an open end portion opposite said open outlet end portion and joining said central portion and having at least at the junction thereof with said central portion a cross-sectional area greater than that of said outlet end portion but smaller than that of said central portion so as to form an annular shoulder face at said junction, and said valve housing being formed at said outlet end portion with a valve seat facing said shoulder face;

a valve member in said housing and engaging with one of its ends said valve seat and extending from the latter toward said opposite end portion of said housing;

an abutment ring of rigid material having an outer diameter defining a cross-sectional area slightly larger than that of said opposite open end portion at said junction and engaging with one end surface thereof said shoulder face;

and spring means between said valve member and said abutment ring for pressing said valve member against said seat and said abutment ring against said shoulder face.

2. A combination as recited in claim 1 in which said cross-sectional area of said opposite end portion increases from said junction to the free end thereof.

3. A combination as defined in claim 1 in which said abutment ring is of frusto-conical configuration.

References Cited in the file of this patent

UNITED STATES PATENTS

| | | |
|---|---|---|
| 2,004,018 | Strauss | June 4, 1935 |
| 2,487,434 | Geiss et al. | Nov. 8, 1949 |
| 2,543,850 | Henricson | Mar. 6, 1951 |
| 2,565,954 | Dey | Aug. 28, 1951 |
| 2,623,785 | Henchert | Dec. 30, 1952 |
| 2,686,081 | Cooksley | Aug. 10, 1954 |
| 2,709,111 | Green | May 24, 1955 |
| 2,713,381 | Seck | July 19, 1955 |
| 2,728,981 | Hooper | Jan. 3, 1956 |
| 2,761,596 | Ward | Sept. 4, 1956 |
| 2,763,271 | Nelson | Sept. 18, 1956 |
| 2,793,794 | Samuel | May 28, 1957 |
| 2,802,490 | Ward | Aug. 13, 1957 |
| 2,814,405 | Edwards | Nov. 26, 1957 |
| 2,835,418 | Manetti | May 20, 1958 |
| 2,842,167 | Tupper | July 8, 1958 |
| 2,908,479 | Goodspeed | Oct. 13, 1959 |

FOREIGN PATENTS

| | | |
|---|---|---|
| 697,043 | Great Britain | Sept. 16, 1953 |